(12) United States Patent
Hidden et al.

(10) Patent No.: US 10,440,029 B2
(45) Date of Patent: Oct. 8, 2019

(54) REDUCING RISKS ASSOCIATED WITH RECERTIFICATION OF DORMANT ACCOUNTS

(71) Applicant: International Business Machines Corporation, Armonk, NY (US)

(72) Inventors: Jean Elizabeth Hidden, Wake Forest, NC (US); Gee Ngoo Chia, Morrisville, NC (US); Brian Robert Matthiesen, Santa Margarita, CA (US); Stephen J. Turcol, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 168 days.

(21) Appl. No.: 14/842,889

(22) Filed: Sep. 2, 2015

(65) Prior Publication Data

US 2017/0063873 A1    Mar. 2, 2017

(51) Int. Cl.
*G06F 17/00* (2019.01)
*H04L 29/06* (2006.01)

(52) U.S. Cl.
CPC .......... *H04L 63/105* (2013.01); *H04L 63/102* (2013.01); *H04L 63/108* (2013.01); *H04L 63/20* (2013.01)

(58) Field of Classification Search
CPC ........... H04L 63/10; H04L 63/102–105; H04L 63/20
See application file for complete search history.

(56) References Cited

U.S. PATENT DOCUMENTS

| | | | |
|---|---|---|---|
| 7,401,149 B2 | 7/2008 | Davis, III et al. | |
| 8,503,634 B1* | 8/2013 | Townsend, III | G06Q 40/02 379/114.04 |
| 2006/0143126 A1* | 6/2006 | Vasishth | G06Q 10/10 705/51 |
| 2007/0011083 A1* | 1/2007 | Bird | G06Q 30/08 705/38 |
| 2008/0046576 A1* | 2/2008 | Wahl | H04L 61/1517 709/228 |
| 2011/0023107 A1 | 1/2011 | Chen et al. | |
| 2013/0067538 A1* | 3/2013 | Dharmarajan | G06F 21/45 726/4 |

(Continued)

OTHER PUBLICATIONS

Hitachi ID Systems, Inc., "Best Practices for Identity Management Projects," Aug. 2015.

(Continued)

*Primary Examiner* — Trong H Nguyen
(74) *Attorney, Agent, or Firm* — Jeffrey S. LaBaw; David H. Judson

(57) ABSTRACT

An identity management system is augmented to provide for automated suspension of all dormant accounts before launching a re-certification campaign (pass). In one implementation, prior to receiving a recertification notice from the system, the affected user's account is already suspended and thus cannot be accessed. Once the recertification succeeds, however, the account is restored. Preferably, the technique is exposed to an IAM system administrator through a simple interface, e.g., a one-click "suspend and re-certify" button in an administrative menu. When the administrator initiates the re-certification process, he or she may select the button for a particular account or user.

17 Claims, 5 Drawing Sheets

(56) References Cited

U.S. PATENT DOCUMENTS

2013/0132293 A1* 5/2013 Sterczyk .............. G06Q 50/01
705/319
2014/0380484 A1 12/2014 Choi et al.

OTHER PUBLICATIONS

Kumar, "Integrated Identity and Access Management Governance White Paper," Dec. 2012.

* cited by examiner

| | Manage Policies > Manage Recertification Policies > General |
|---|---|
| ⇒ General | |
| Target Type | To create a recertification policy, type the name of the policy, a brief description, and select a status. |
| Additional Steps... | *Name |
| | [ Bulk Recertification Policy ] |
| | Description |
| | [                                    ▲ ] |
| | [                                    ▼ ] |
| | Policy status |
| | ⦿ Enabled  ○ Disabled |
| | 600 |
| | [ Suspend-and-recertify ] ~602 |
| [< Back] [Next >] [Finish] [Cancel] | |

FIG. 6

REDUCING RISKS ASSOCIATED WITH RECERTIFICATION OF DORMANT ACCOUNTS

BACKGROUND

Technical Field

This disclosure relates generally to the field of digital resource access, and more particularly to risk-based computer recertification of online access.

Background of the Related Art

Identity and Access Management Governance is a set of processes and policies for organizations to manage risks and maintain compliance with regulations and policies by administering, securing, and monitoring identities and their access to applications, information, and systems. Although potentially complex in implementation, the concept of Identity and Access Management (IAM) Governance is fairly straightforward: determine who should have access to what resources and who should not, according to government regulations, industry-specific regulations (SOX, HIPPA, GLBA, etc.), and business regulations and guidelines. Typically, key aspects of IAM Governance include access request governance, entitlement certifications, reports and audits, and analytics and intelligence (including role management, entitlement management, separation of duties enforcement, and privileged identity management). An end-to-end IAM Governance solution may also provide related functions, such as access enforcement, user provisioning, password management, and user lifecycle management.

Identity and access management (IAM) systems protect enterprise data and applications with context-based access control, security policy enforcement and business-driven identity governance. These systems may be operated in a standalone manner, in association with cloud-based environments, or in hybrid environments.

Automated systems for IAM health checking detect identity-centric risks within a governance system by scanning for one or more weakness patterns, such as too many Admins configured, account sharing, or cloning of access permissions. One IAM task involves conducting an audit of existing accounts and determining whether the entitlements associated with an identified account should be recertified. The notion of recertification typically involves reaching out to a user proactively and asking whether he or she still needs the account. By providing the recertification advance notice, however, the system may increase security risks by reminding the user that he or she still has the account. Indeed, in certain circumstances the recertification notice may tip a hacker, or nefarious insider, that the system has detected a dormant account, or perhaps an inappropriate use or ownership of an entitlement for the account. By receiving such notice, and knowing that the entitlement is about to be removed or discovered, the individual may escalate/initiate an attack.

It would be highly desirable to provide IAM systems with the ability to undertake recertification of accounts without at the same time increasing security risks associated with such activities.

BRIEF SUMMARY

According to this disclosure, an identity management system is augmented to provide for automated suspension of all dormant accounts before launching a re-certification campaign (pass). In one implementation, prior to receiving a recertification notice from the system, the affected user's account is already suspended and thus cannot be accessed. Once the re-certification succeeds, however, the account is restored. Preferably, the technique is exposed to an IAM system administrator through a simple interface, e.g., a one-click "suspend and recertify" button in an administrative menu. When the administrator initiates the recertification process, he or she may select the button for a particular account or user, or a particular group of accounts or users, or the like. The suspend before certification notice approach carefully balances the need to recertify dormant accounts while at the same time ensuring that the governance process itself does not increase security risks.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 6 is a representative display interface that may be used to configure one-click "suspend and re-certify" operation according to this disclosure.

DETAILED DESCRIPTION OF AN ILLUSTRATIVE EMBODIMENT

Figure 1:
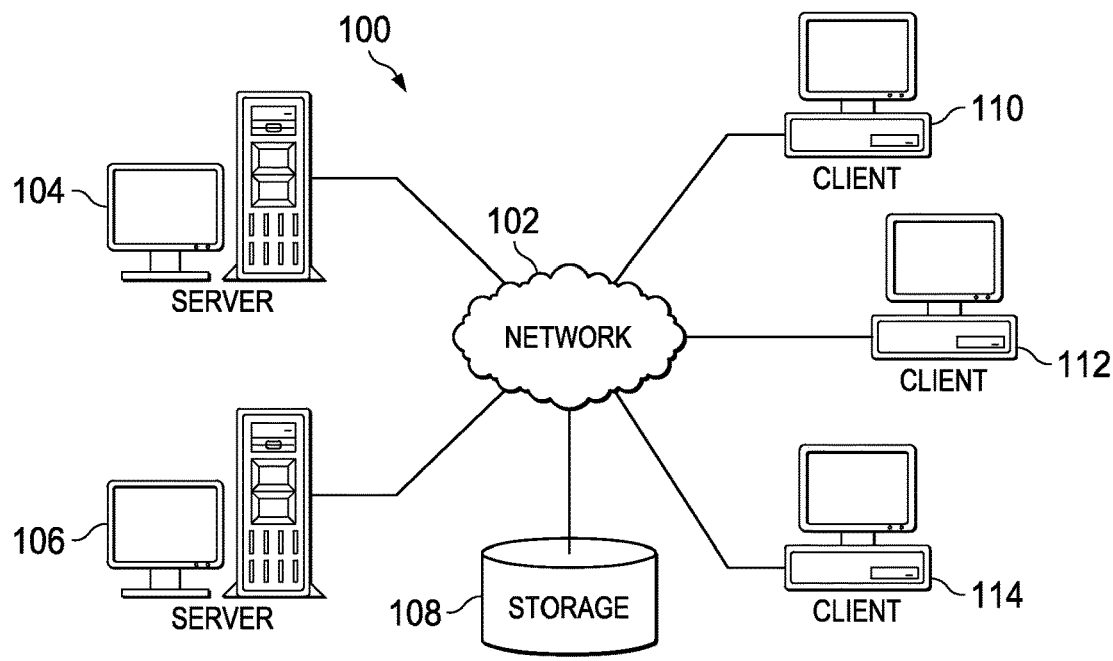
FIG. 1 depicts an exemplary block diagram of a distributed data processing environment in which exemplary aspects of the illustrative embodiments may be implemented.
Figure 2:
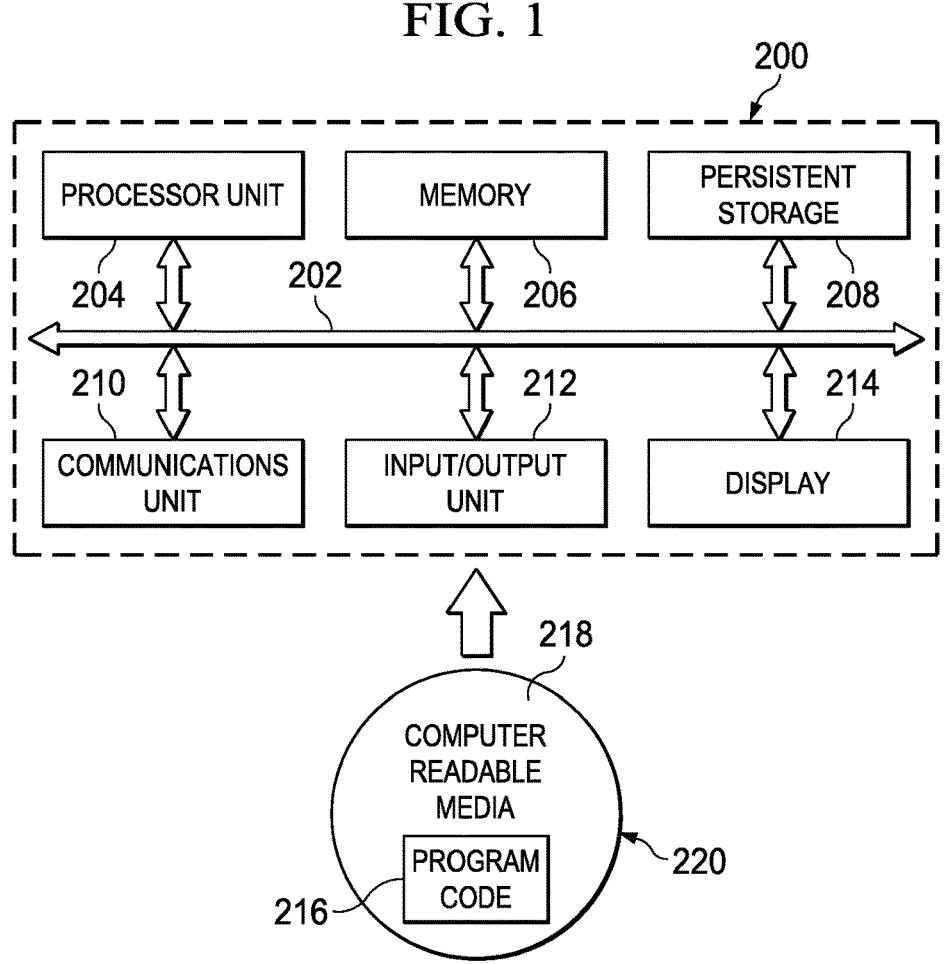
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Identity and Access Management

As used herein, an "account" typically refers to an entity that contains a set of parameters that define application-specific attributes of a principal, which include the identity, user profile, and credentials.

"Access" refers the ability to read, update, delete, or otherwise use a resource. Access to protected resources is typically controlled by system software.

A "credential" refers to a declaration of authorization or other security attributes of a subject that is typically validated and signed by a trusted third party. Typically, a credential represents the ID and authenticators (such as a password) for a resource.

A "continued business need" (CBN) is a notification (e.g., by email or otherwise) to an account owner asking if the owner continues to have a legitimate need to access the account.

An "entitlement" refers to a capability-based reason that a user is given a permission or set of permissions to access IT resources (services).

An "identity" refers to a subset of profile data that uniquely represents a person or entity and that is stored in one or more repositories.

A "dormant account" is an account that has not been used for a given, preferably configurable-time period (e.g., a number of days). A dormant account typically is associated with a service. Preferably, servers in the system are configured to record last login information, and to provide (return) this information upon request. By reconciling the last login information, the system can determine the existence of dormant accounts.

A "dormant account report" lists the accounts that are not recently used, and it may include the service information of the dormant account, the number of days dormant, and a list of accounts dormant as of the report date. Preferably, accounts that do not have last access information are not considered dormant. Accounts that are not dormant include both new accounts for which a Last Access Date field is blank, and existing accounts that are not used.

An "orphan account" is an account on a managed resource, an account whose owner cannot be automatically determined by the system.

An "ownership type" refers to a category that classifies ownership accounts. One account preferably can have only one type of ownership. Accounts can be marked with different ownership types depending on their use. Default ownership types include, for example, device, personal, system, and vendor.

A "person" is an individual in the system that has a person record in one or more corporate directories.

A "policy" is a set of considerations that influence the behavior of a managed resource or a user.

A "principal" is a person or group that has been granted permissions. It also refers to an entity that can communicate securely with another entity.

A "recertification" refers to the process of validating and possibly updating credentials with a system, typically after a specified time interval. A "recertification policy" refers to a policy that defines the life cycle rule for automatically validating accounts and users in a provisioning system at a specified frequency. The policy sends approvals to the recertification policy participants asking if the accounts or users are still to be certified.

In identity management, "provisioning" refers to the process of providing, deploying, and tracking a service or component. To "provision" means to set up and maintain the access of a user to a system, or to create an account on a managed resource.

A "provisioning policy" is a policy that defines the access to various managed resources (services), such as applications or operating systems. Access is granted to all users, users with a specific role, or users who are not members of a specific role.

A "resource" is a hardware, software, or data entity.

A "role" is a logical group of principals that provide a set of permissions. Access to resources is controlled by using provisioning policy to grant access to a role. A role can also represent a group of principals based on business job title or other business-related attributes.

A "service" is a representation of a managed resource, application, database, or system. In an identity management system, typically a service represents the user repository for a managed resource.

A "user" is an individual, organization, process, device, program, protocol, or system that uses the services of a computing system. For example, a user is an individual who uses the identity management system to manage their accounts and passwords, or that is managed by the system.

A "user recertification policy" is a policy that provides a periodic re-validation process for a user's role memberships, accounts, and group membership of accounts. Typically, user recertification combines recertification of multiple resources and memberships into a single activity to be completed by a designated approver.

For many applications, networks, databases and other resources, users are given "access" by an authority or administrative role to enable activity associated with the resource. The conditions and limitations of the access for a given user are referred to as the "access entitlement" of the user, and include defined limitations as to the activities the user may perform with or on the resource. Access entitlements among users of the same resource can vary. For instance, a database administrator may have access and authority to read, write, edit, search, copy, delete and transfer data for a specific database, whereas others with access to the database may be limited to searching and reading data.

Identity management (IdM) is an administrative area that utilizes a system to identify individuals with membership or association, such as with a group, organization, company, etc. Additionally, an IdM system controls the individual's access to resources by use of restrictions or permissions. To facilitate better decisions for granting appropriate access, information regarding a user's request for access, their job role, and whether the access is a new request or renewal is considered, however, this limited information can prove ineffective in preventing high risk situations.

Control and oversight of resource access approval of individuals in business or enterprise organizations are further challenged by the turnover of personnel, the dynamic day-to-day changes and organizational restructuring, as well as application version upgrades. In large organizations, granting users the appropriate access entitlements to resources and maintaining access entitlements is a difficult task that can involve thousands of users and hundreds of resources. Resource access decisions and compliance verification responsibilities are typically allocated to supervisors or managers, who have few tools to facilitate decisions or identify risks and due to time constraints, often provide access in the belief that the individuals' performance will improve or not be impacted.

It is known in the prior art to provide software and services to deploy policy-based provisioning solutions. These solutions help companies automate the process of provisioning employees, contractors, and business partners with access rights to the applications they need, whether in a closed enterprise environment or across a virtual or extended enterprise. A known product of this type is IBM® Security Identity Manager.

Figure 3:
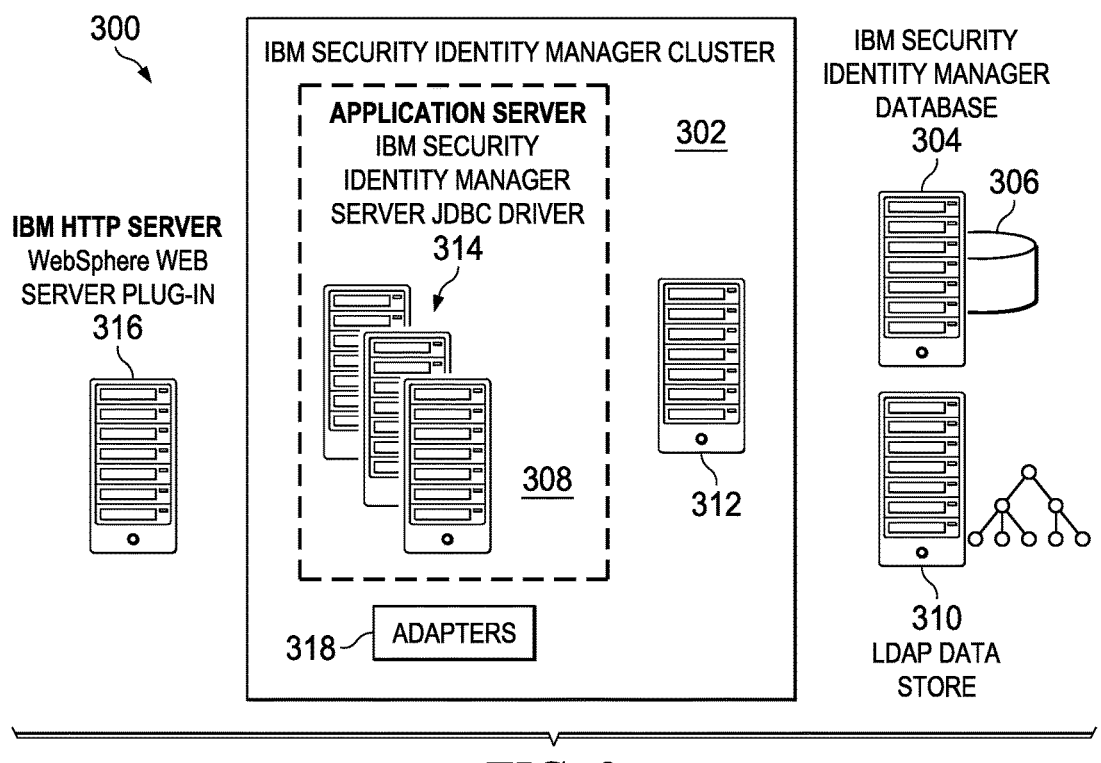
FIG. 3 is a representative security identity management system in which the disclosed subject matter may be implemented.

FIG. 3 is a block diagram of this commercially-available identity manager solution. In one embodiment, as will be described, the techniques of this disclosure may be implemented in such a solution. This identity manager solution, however, is merely representative and should not be taken to limit this disclosure. The representative commercial implementation is known as IBM® Security Identity Manager, Version 6.0. That product manages the identity records that represent people in a business organization. In particular, the product is an identity management solution that centralizes the process of provisioning records, such as provisioning accounts on operating systems, applications, etc., to users. Among other features, the product affords an organization the ability to add business processes and security policies to basic user management. As will be described in more detail below, the solution also affords the ability to add approvals for user requests to access requests. In general, the solution provides a uniform way to manage user accounts and to delegate administration, including self-service and a help desk user interface.

As illustrated in FIG. 3, the main components of the IBM® Security Identity Manager solution 300 include IBM Security Identity Manager Server 302 and required and optional middleware components, including adapters that provide an interface to managed resources. In a cluster configuration as illustrated, the components include a database server 304 that stores transactional and historical data, and a relational database 306 that maintains current and historical states of data. Computers that communicate with the database typically require a Java™ Database Connectivity driver (JDBC driver) 308. For example, a JDBC driver enables an IBM Security Identity Manager Server to communicate with a data source. IBM Security Identity Manager supports a JDBC type 4 driver to connect a Java-based application to a database. The supported database products are IBM DB2® Database, Oracle DB, and MS SQL Server database. As also seen in FIG. 3, the solution also includes a directory server 310 to store a current state of the managed identities (including user account and organizational data) in an LDAP (or equivalent) directory. Thus, for example, IBM Security Identity Manager supports the following products: IBM Tivoli® Directory Server, and Sun Enterprise Directory Server. The solution also preferably includes a directory integrator 312, such as IBM Tivoli Directory Integrator, to synchronize identity data in different directories, databases, and applications. IBM Tivoli Directory Integrator synchronizes and manages information exchanges between applications or directory sources. The solution also includes one or more application servers 314, such as IBM WebSphere® Application Server. WebSphere Application Server runs a Java virtual machine (JVM) that provides a runtime environment for the application code. The application server provides communication security, logging, messaging, and Web services. As also seen in FIG. 3, typically the configuration includes one or more WebSphere Application Servers and a deployment manager that manages the cluster. The solution also typically includes an HTTP server and WebSphere Web Server plug-in 316. An HTTP server provides administration of IBM Security Identity Manager through a client interface in a web browser. Finally, the solution typically includes one or more IBM Security Identity Manager adapters 318. An adapter is a program that provides an interface between a managed resource and the IBM Security Identity Manager Server. Adapters function as trusted virtual administrators on the target platform for account management. For example, adapters do such tasks as creating accounts, suspending accounts, and modifying account attributes. An IBM Security Identity Manager adapter can be either agent-based or agentless. An agent-based adapter is one wherein the user installs adapter code directly onto the managed resource with which it is designed to communicate. An agentless adapter is deployed onto the IBM Security Identity Manager Server and the system that hosts IBM Tivoli Directory Integrator. In this case, the adapter code is separate from the managed resource with which it is designed to communicate.

As noted above, the implementation shown in FIG. 3 is not intended to be limiting but, rather, merely illustrates one possible operating environment; other commercial or proprietary implementations may include similar components and functionalities.

Each of the machines shown in FIG. 3 may be implemented using the machine architecture shown in FIG. 2; the various machines may interact with one another as illustrated in FIG. 1.

The security identity management solution of this type also may be implemented in whole or in part in a cloud-based solution.

Figure 4:
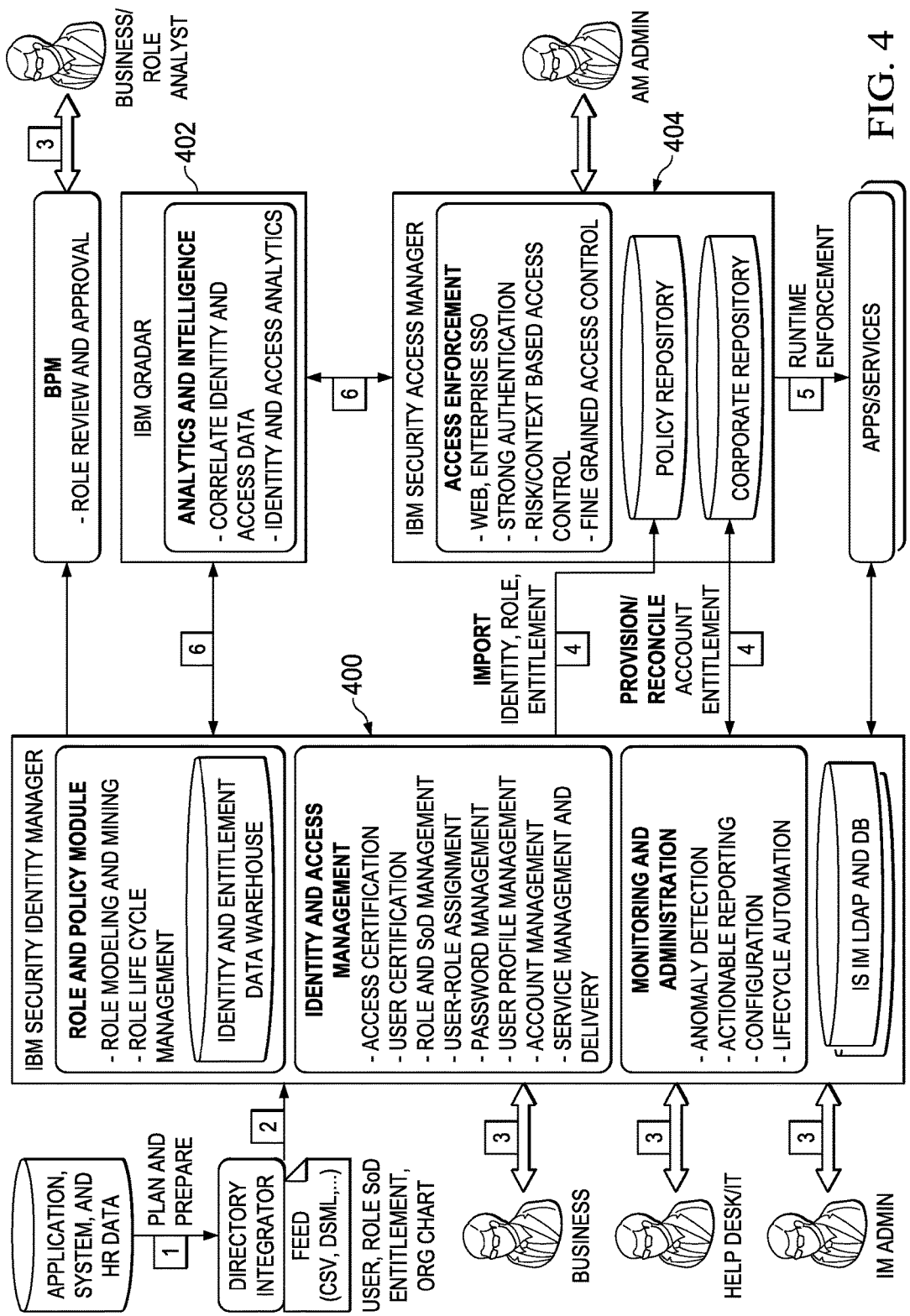
FIG. 4 illustrates a step-by step-guide for implementing IAM governance using an Identity and Access Management system.

FIG. 4 illustrates a representative step-by step-guide for implementing IAM governance using an Identity and Access Management system 400 such as IBM Security Identity Manager. In this embodiment, an end-to-end solution is provided in association with several other systems including a Security Information and Event Management (SIEM) software system 402 (e.g., IBM QRadar®), and an access and entitlement enforcement system (e.g., IBM® Security Access Manager) 404.

At step (1), the enterprise identifies the resources that it wants protected and the accesses it wants certified and monitored. The data is cleaned, filtered, and prepared for loading into the Identity and Access Management system 400 through TDI, LDAP Feed, flat files (CSV, DSML, etc.), or API. At step (2), the data may be loaded into a role and policy module 402 for modeling and management. This data can come from various sources: Human Resources (HR), a planning and modeling tool, or manual entry. In a typical use case, the data gathered during planning is saved (e.g., in a standard CSV file) and then imported into IBM Security Identity Manager for role and policy modeling. The system can export the modeled role and entitlement data (e.g., in XML format) and load it for lifecycle management and certification. At step (3), stakeholders and participants can use the Identity and Access Management system 400 for the various tasks that they must perform, such as requesting accesses and roles, approving access and role requests, certifying, managing, and modeling roles, and reviewing and certifying roles and entitlements. The certification data can be used to clean, adapt, and evolve the system. As step (4), the access and entitlement enforcement system 404 imports or provisions the data from Identity and Access management system 400 into the access and entitlement enforcement systems. At step (5), the enforcement system 404 uses the certified data for runtime enforcement. The STEM system 402 monitors actual user activity and provides feedback to fine-tune access policy planning, administration, and enforcement.

As illustrated in FIG. 4, one of the responsibilities of the Identity and Access Management system 400 is to provide initial and periodic access certification for continued business needs to help direct and control operations. Access certification typically includes review and certification of user access assignment via role or direct assignment to determine who received access to what, when, and why. It ensures that users have only the privileges and exception entitlements they need to perform their job. Access certification can also be used to detect policy violations, access anomalies, and orphan and dormant accounts. The IAM system typically also maintains certification and access change history, which aids the certification and audit processes.

The system also supports the notion of user to role recertification and user to access recertification according to a recertification policy. Recertification policy simplifies and automates the process of periodically revalidating a target type (account or access) or a membership (role or resource group). Depending on the business needs and the risk level of protected resources, organizations can set a suitable period to perform the scheduled access certification. They can also kick off a certification campaign that is based on-demand or on an event, such as a management event or anomaly detection. The process sends recertification notification (e.g., CBN) and approval events to the participants. A recertification policy includes activities to ensure that users provide confirmation that they have a valid, ongoing need for a specified resource or membership. Typically, the recertification policy also defines the operation that occurs if the recipient declines or does not respond to the recertification request. Recertification policies use a set of notifications to initiate workflow activities in the recertification process. For example, a system administrator of a specific service can create a recertification policy for the service that sets a 90-day interval for account recertification. If the recipient of the recertification declines recertification, the account can be automatically suspended. During the certification process, the system can do bulk or selective certification. For a time-critical certification, the system may provide options to automatically escalate or delegate the action item to an alternate user when timely action is not taken.

Preferably, the system enables certifiers can preview the impact of the certification before submitting it to see if any roles, accounts, or groups are affected by the access decision. Approval and recertification policies deliver change control at the user, role, and access level. Without substantially impacting the business, the change control process can consume any change to the business that affects the user, role, and access structure.

Reducing Risk Associated with Recertification of Dormant Accounts

With the above as background, the subject matter of this disclosure is now described. As described above, and according to this disclosure, an identity management system is augmented (i.e. extended or supplemented) to provide for automated suspension of dormant accounts before launching a re-certification campaign. Thus, prior to receiving the re-certification notice (e.g., the CBN) from the system, an affected user's account is already suspended and thus cannot be accessed by the user in response to receipt of the CBN. Once the recertification succeeds, however, the account access is restored.

Figure 5:
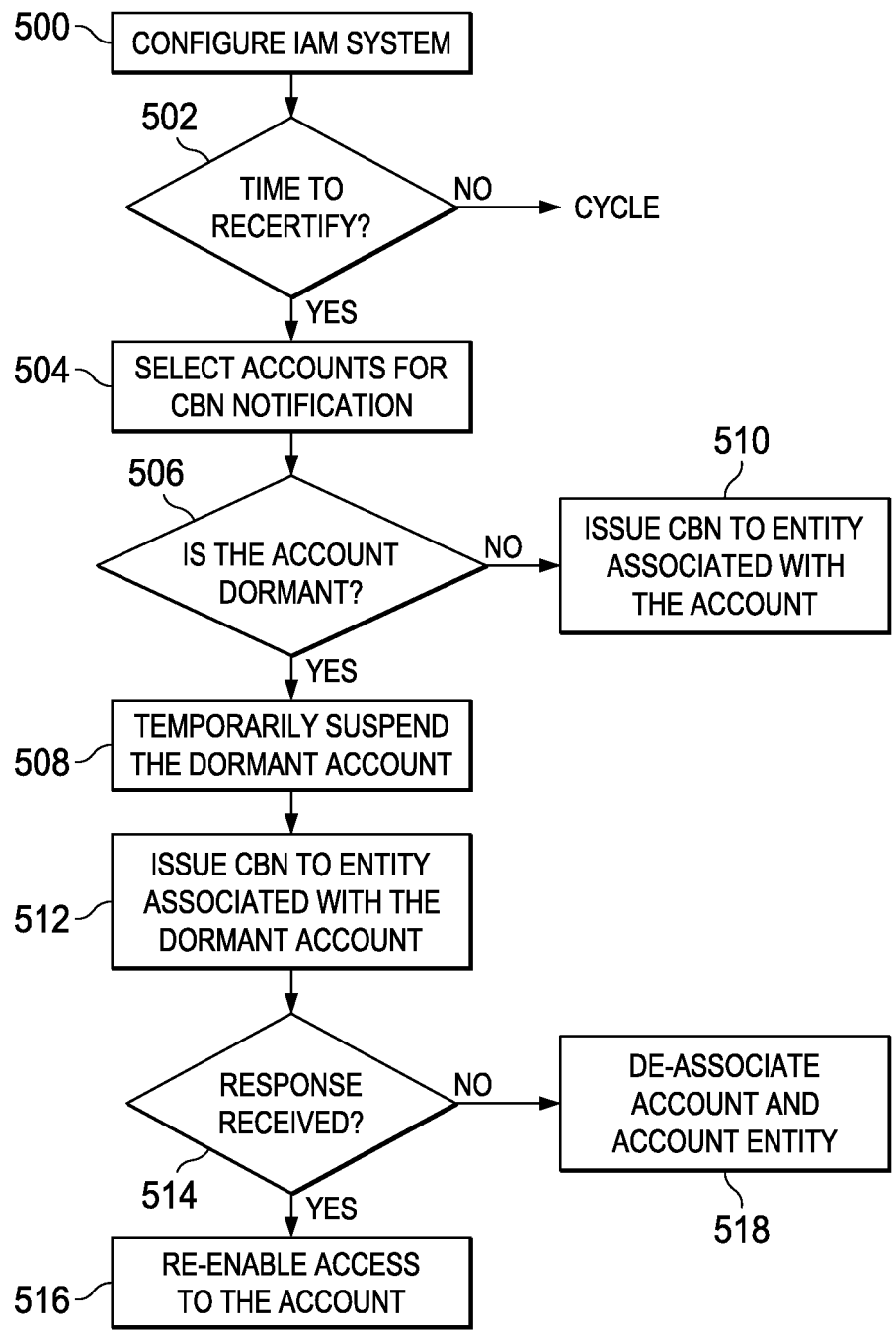
FIG. 5 depicts a process flow of the basic technique of this disclosure.

FIG. 5 is a process flow that depicts that process at a high level. The process begins at step 500 by an administrator configuring an identity and access management system to enable dormant accounts to be temporarily suspended during a recertification campaign. This operation may be carried out on an administrative interface, preferably using a simple "one-click" type of operation. In a preferred approach, the administrator selects a "suspend and recertify" option that is exposed in the interface. Alternatively, the system may be configured (by policy or otherwise) to temporarily suspend the dormant account programmatically or automatically upon initiation of a recertification operation. The identity and access management system may be of the type described above.

At step 502, a test is performed to determine whether a recertification campaign (sometimes referred to as a "pass") is to be initiated. The campaign may be initiated periodically, or upon occurrence of a given event, typically as defined in a recertification policy. If the outcome of the test indicates that the recertification campaign is not yet to be initiated, the routine cycles. If, however, the outcome of the test at step 502 indicates that the recertification campaign is to be initiated, processing then continues at step 504. At step 504, accounts are selected for notification, e.g., via CBN. The accounts may be selected manually, automatically or programmatically. At step 506, a test is performed to determine if the account selected for notification is a dormant account. Step 506 is carried out iteratively for each account, or for groups of accounts, as necessary. The operation may involve obtaining a dormant account report. If the outcome of the step 506 indicates that the account is a dormant account, control branches to step 508 to temporarily suspend the dormant account. If, on the contrary, the account is not dormant, control continues as usual in step 510 to send the CBN to the user. When the account is a dormant account, and according to this disclosure, it is suspended to ensure that the affected user does not receive advance notice of the CBN. In this manner, the governance system insures that the user cannot take action (in response to receipt of the notice itself) to re-institute his or her use of the account. By temporarily suspending the account in advance of sending the CBN, the approach ensures that the recertification process itself does not provide a vector by which a hacker or nefarious insider learns that his or her access to the account is about to be terminated, thereby affording that user an opportunity to login and use the account.

With respect to each dormant account that been suspended in this manner, the routine then continues at step 512 to provide the notification to the impacted user. At this point, and because the dormant account access has been suspended, the user who receives the CBN is powerless to access the account (and perhaps do damage). A test is then performed at step 514 to determine whether an appropriate response is received (within a configurable time period) from the user, e.g., indicating that the user still has a continued business need for the account access. If the outcome of the test at step 514 is positive, the routine continues at step 516 to re-enable account access (and to change the status of the dormant account as necessary). If the outcome of the test at step 514 is negative (indicating that the user either has not responded, or has responded in a manner indicating no continued business need), the account is dis-associated with the user. This is step 518. This ends the process.

The above-identified operations may be carried out on a dormant account-by-dormant account basis, or in bulk. The system may be configured to select certain dormant accounts for CBN, and to selectively suspend all or some configured subset of the dormant accounts in the manner described. The operations may be carried out directly, or indirectly in association with some other governance operation, e.g., managing orphan accounts.

Preferably, and as noted above, the technique is exposed to the IAM system administrator through a simple interface, e.g., a one-click "suspend and re-certify" button in an administrative menu. FIG. 6 depicts a representative interface 600 having the "suspend and recertify" button 602. When the administrator initiates the recertification process, he or she may select the button for a particular account or user.

The subject matter described herein has significant advantages over the prior art. Using the approach, administrators temporarily suspend dormant accounts before providing recertification notices to impacted user. This process ensures that the recertification advance notice itself does not increase security risks, namely, by reminding the user that he or she still has the account. The approach ensures that the recertification notice itself does not tip a hacker, or nefarious insider, that the system has detected a dormant account, or perhaps an inappropriate use or ownership of an entitlement for the account. By suspending the account in advance of sending the notice, governance is enhanced, as the impacted user cannot act to initiate or escalate an attack based merely on the knowledge that the entitlement is about to be removed. The approach provides for an enhanced IAM system because the governance itself does not become a vector for gaming. The approach enables effective dormant account recertification without at the same time increasing security risks associated with such activities.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may be practiced in a loosely-coupled server (including a "cloud"-based) environment. In particular, the "suspend and recertify" configuration tool, the administration page, or the workflow functions (or components thereof) may be hosted in the cloud.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the identity context-based access control functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the administrator configurator and the suspension workflow components are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

Further, any authentication or authorization functionality required herein may be implemented as an adjunct or extension to an existing access manager or policy management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, namely, identity access and management systems, as well as improvements to the functioning of recertification processes within such systems.

Having described our invention, what we now claim is as follows:

1. A method to improve an identity and access management (IAM) system to thereby reduce risk associated with recertification of an account having an access entitlement, comprising:
   providing a display interface of the IAM system to receive information configuring the IAM system to enable dormant accounts to be temporarily suspended prior to initiation of a recertification campaign;
   selecting accounts for recertification in accordance with a recertification policy;
   determining which of the selected accounts are dormant accounts;
   for each of the determined dormant accounts, and responsive to the receipt of the information, automatically and temporarily suspending access to the determined dormant account prior to initiating recertification of the suspended dormant account;
   while the suspended dormant account is temporarily suspended, and prior to the initiation of the recertification of the suspended dormant account, issuing a notification to an entity associated with the suspended dormant account to determine whether the entity has a continued access need with respect to the suspended dormant account, wherein the suspending access to the suspended dormant account prior to the initiation of the recertification of the suspended dormant account ensures the suspended dormant account is unable to be accessed by the entity and the notification is not used by the entity as an attack vector; and
   responsive to a receipt of an indication that the entity has the continued access need, removing the temporary suspension of the suspended dormant account.

2. The method as described in claim 1 wherein the information is a control command that initiates a suspend-and-recertify operation with respect to one or more dormant accounts.

3. The method as described in claim 1 wherein the notification is a continued business need (CBN) notice.

4. The method as described in claim 1 wherein the step of determining which of the selected accounts are dormant accounts includes one of: receiving a dormant account report identifying one or more dormant accounts, and querying a service to obtain last login data for a particular account associated with the service.

5. The method as described in claim 1 further including:
   responsive to a receipt of an indication that the entity has no continued access need, de-associating the suspended dormant account and the entity.

6. An apparatus, comprising:
   a processor;
   computer memory holding computer program instructions executed by the processor to improve an identity and access management (IAM) system to thereby reduce risk associated with recertification of an account having an access entitlement, the computer program instructions comprising:
   program code operative to provide a display interface of the IAM system to receive information configuring the IAM system to enable dormant accounts to be temporarily suspended prior to initiation of a recertification campaign;
   program code operative to select accounts for recertification in accordance with a recertification policy;
   program code operative to determine which of the selected accounts are dormant accounts;

program code operative for each of the determined dormant accounts and responsive to the receipt of the information to automatically and temporarily suspend access to the determined dormant account prior to initiating recertification of the suspended dormant account;

program code operative while the suspended dormant account is temporarily suspended, and prior to the initiation of the recertification of the suspended dormant account, to issue a notification to an entity associated with the suspended dormant account to determine whether the entity has a continued access need with respect to the suspended dormant account, wherein the suspending access to the suspended dormant account prior to the initiation of the recertification of the suspended dormant account ensures the suspended dormant account is unable to be accessed by the entity and the notification is not used by the entity as an attack vector; and program code operative in response to a receipt of an indication that the entity has the continued access need to remove the suspension of the suspended dormant account.

7. The apparatus as described in claim 6 wherein the information is a control command that initiates a suspend-and-recertify operation with respect to one or more dormant accounts.

8. The apparatus as described in claim 6 wherein the notification is a continued business need (CBN) notice.

9. The apparatus as described in claim 6 wherein the computer program instructions operative to determine which of the selected accounts are dormant accounts include program code further operative to receive a dormant account report identifying one or more dormant accounts or to query a service to obtain last login data for a particular account associated with the service.

10. The apparatus as described in claim 6 wherein the computer program instructions further include program code operative in response to a receipt of an indication that the entity has no continued access need to de-associate the suspended dormant account and the entity.

11. A computer program product in a non-transitory computer readable medium for use in a data processing system, the computer program product holding computer program instructions which, when executed by the data processing system, to improve an identity and access management (IAM) system to thereby reduce risk associated with recertification of an account having an access entitlement, the computer program instructions comprising:

program code operative to provide a display interface of the IAM system to receive information configuring the IAM system to enable dormant accounts to be temporarily suspended prior to initiation of a recertification campaign;

program code operative to select accounts for recertification in accordance with a recertification policy;

program code operative to determine which of the selected accounts are dormant accounts;

program code operative for each of the determined dormant accounts and responsive to the receipt of the information to automatically and temporarily suspend access to the determined dormant account prior to initiating recertification of the suspended dormant account;

program code operative while the suspended dormant account is temporarily suspended, and prior to the initiation of the recertification of the suspended dormant account, to issue a notification to an entity associated with the suspended dormant account to determine whether the entity has a continued access need with respect to the suspended dormant account, wherein the suspending access to the suspended dormant account prior to the initiation of the recertification of the suspended dormant account ensures the suspended dormant account is unable to be accessed by the entity and the notification is not used by the entity as an attack vector; and program code operative in response to a receipt of an indication that the entity has the continued access need to remove the suspension of the suspended dormant account.

12. The computer program product as described in claim 11 wherein the information is a control command that initiates a suspend-and-recertify operation with respect to one or more dormant accounts.

13. The computer program product as described in claim 11 wherein the notification is a continued business need (CBN) notice.

14. The computer program product as described in claim 11 wherein the computer program instructions operative to determine which of the selected accounts are dormant accounts include program code further operative to receive a dormant account report identifying one or more dormant accounts or to query a service to obtain last login data for a particular account associated with the service.

15. The computer program product as described in claim 11 wherein the computer program instructions further include program code operative in response to a receipt of an indication that the entity has no continued access need to de-associate the suspended dormant account and the entity.

16. An apparatus for improving a security capability of an identity access and management (IAM) system, the IAM system having accounts, each account of the accounts having an access entitlement, comprising:

a hardware processor;

computer memory holding computer program instructions executed by the hardware processor to provide account access recertification according to a recertification policy, the computer program instructions operative to receive a suspend-and-recertify control command via a display interface of the IAM system to enable dormant accounts to be temporarily suspended prior to initiation of a recertification campaign, responsive to the receipt of the suspend-and-recertify control command to select accounts for recertification in accordance with the recertification policy, to determine which of the selected accounts are dormant accounts, to automatically and temporarily suspend access to each of the determined dormant accounts prior to issuing a continued business need (CBN) notification to an entity associated with the suspended dormant account, and while the suspended dormant account is temporarily suspended and prior to initiating recertification of the suspended dormant account, to issue the CBN notification to the entity, wherein the suspending access to each of the determined dormant accounts prior to initiating the CBN notification ensures the suspended dormant account is unable to be accessed by the entity and that the CBN notification is not used by the entity as an attack vector.

17. The apparatus as described in claim 16 wherein the computer program instructions are further operative to restore access to a dormant account upon a receipt of a given response to a CBN notification.

* * * * *